G. WILCOX.
SOLAR HEATER.
APPLICATION FILED APR. 10, 1916.
1,250,260.
Patented Dec. 18, 1917.
2 SHEETS—SHEET 1.
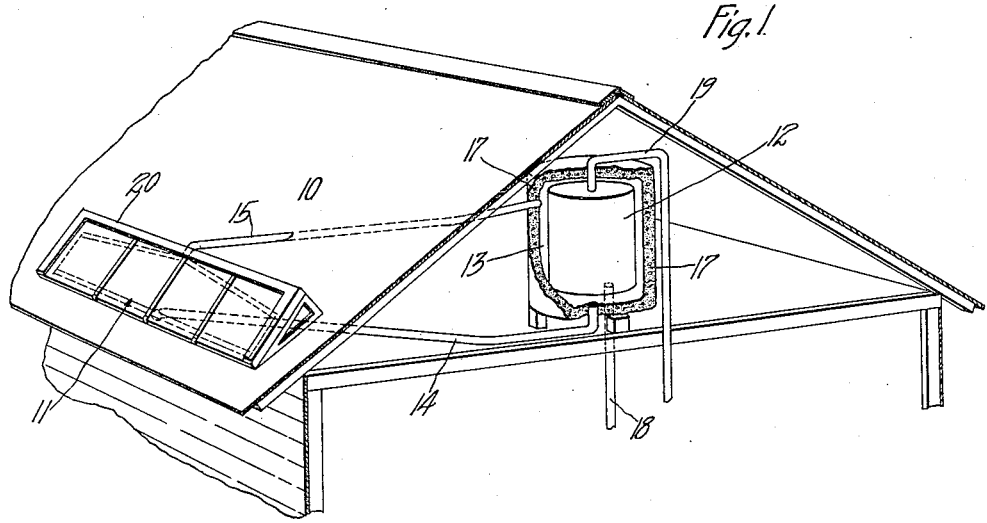
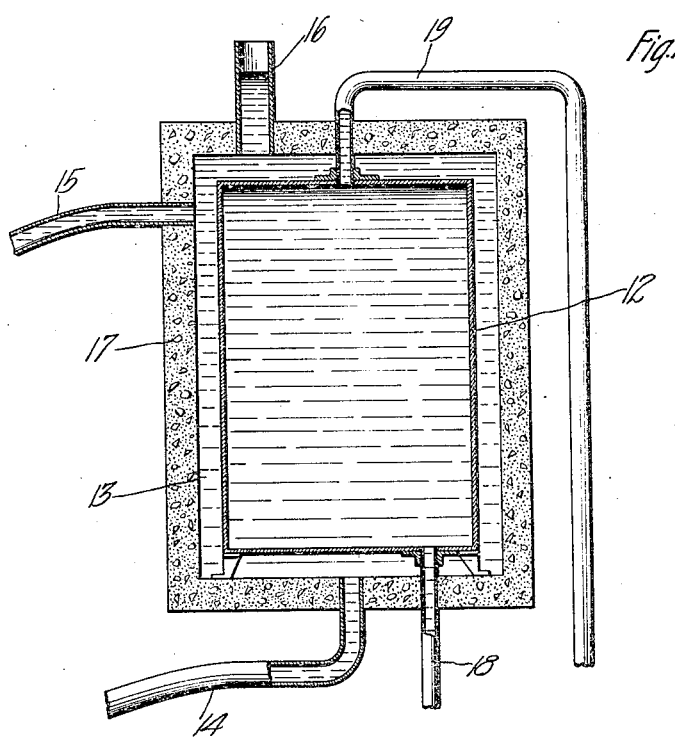
Inventor
George Wilcox
by Hazard, Berry & Miller
his Attorneys.

G. WILCOX.
SOLAR HEATER.
APPLICATION FILED APR. 10, 1916.
1,250,260.
Patented Dec. 18, 1917.
2 SHEETS—SHEET 2.
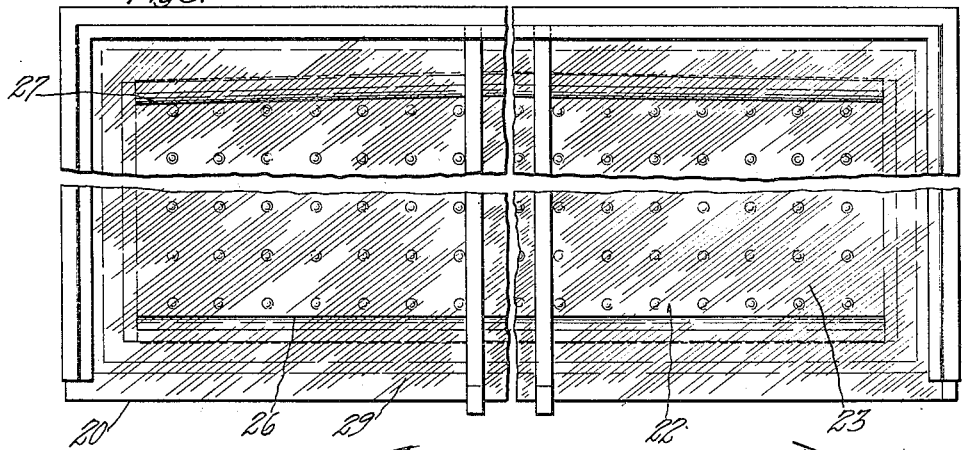
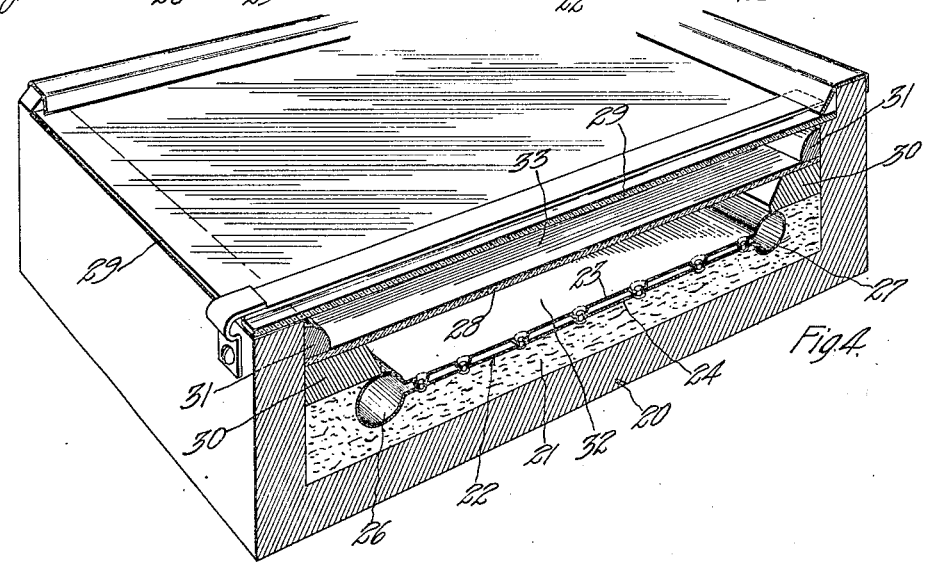
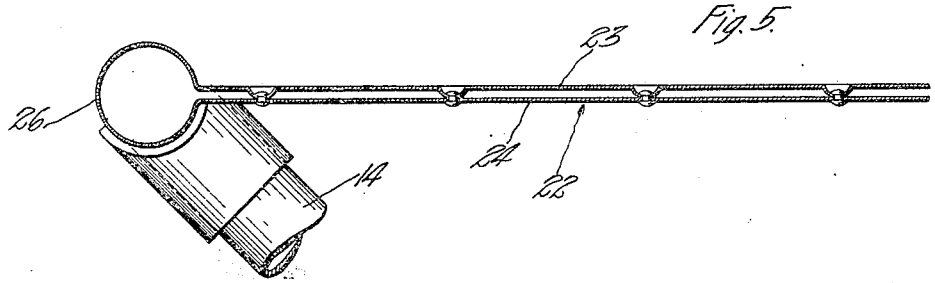
Inventor
George Wilcox
by Hazard Berry & Miller
his Attorneys.

UNITED STATES PATENT OFFICE.

GEORGE WILCOX, OF BUENA PARK, CALIFORNIA.

SOLAR HEATER.

1,250,260.  Specification of Letters Patent.  Patented Dec. 18, 1917.

Application filed April 10, 1916. Serial No. 90,220.

*To all whom it may concern:*

Be it known that I, GEORGE WILCOX, a citizen of the United States, residing at Buena Park, in the county of Orange and State of California, have invented new and useful Improvements in Solar Heaters, of which the following is a specification.

My invention relates to a solar heater.

It is an object of this invention to construct a solar heater which is simple of construction, not liable to get out of order and highly efficient. The solar heaters commonly used lack efficiency in not utilizing the solar heat to the greatest possible extent. Furthermore, they are liable to leakage after a few years of use. It is especially the last named defect which has prevented the general use of solar heaters.

It is another object of this invention to construct a solar heater, in which a salt solution, such as calcium chlorid is used as a heating means, whereby the hot water storage tank is indirectly heated. The advantage of using a salt solution is two-fold. It may be heated to a temperature considerably above the boiling point of water and it will not cause deposits in the heating apparatus, such as lime deposits which practically always occur when the water of the storage tank is heated by the direct system.

It is another object of this invention to improve the structure of the heating apparatus whereby the heat absorbing efficiency of the same is considerably increased. For this purpose, I mount a heater upon a bed of heat insulating material composed of a mixture of magnesium and asbestos or other suitable material. The heater is also constructed with a view of causing a positive and rapid circulation of the heating medium, thereby increasing its heating efficiency.

Another object of this invention is to provide a heater element in which the liquid may freeze without bursting the element and causing leaks.

With the above and other objects in view which will appear as the description proceeds, my invention consists in the construction, combination and arrangement of parts hereinafter described and claimed.

In the accompanying drawings which form a part of this specification, I have illustrated a convenient and practical embodiment of my invention, and in which:

Figure 1 is a perspective view partly in section of the roof of a house to which my solar heating system is applied.

Fig. 2 is a central vertical section of the hot water storage tank with its heating jacket and connections thereto.

Fig. 3 is a top plan view of the solar heater.

Fig. 4 is a perspective view of the same showing the internal construction.

Fig. 5 is an enlarged detail view showing the heating chamber.

On the roof 10 of a house, a solar heater element 11 is permanently mounted by any suitable means. The heater heats the hot water storage tank 12 by means of a jacket 13 completely surrounding said tank and connected with the solar heater by circulation pipes 14, 15. The lower pipe 14 conducts the cooler heating medium from the jacket to the heater, while the upper pipe 15 rising from the upper end of the heater conducts the heating medium from the heater to the jacket. An open pipe 16 projects from the upper part of the jacket and serves to allow for the expansion and contraction of the heating medium. 17 designates a casing filled with any suitable heat insulating material which completely surrounds the heating jacket.

I use as my heating medium a salt solution, preferably calcium chlorid, though any other suitable salt solution may be substituted therefor. I have obtained excellent results from a salt solution having a specific gravity of 32 degrees Baumé. I have obtained a temperature of 256 degrees F. in an open tank therewith, the boiling temperature of the same being considerably higher. Since calcium chlorid is hygroscopic, the heating medium will not evaporate through the open pipe 16.

The storage tank is provided with a water inlet pipe 18 leading to the bottom thereof and a hot water service pipe 19 leading from the top thereof.

The solar heater element 11 comprises a casing 20 at the bottom of which a heat insulating material 21 consisting of a layer of pulverized magnesite and asbestos is placed. The magnesite and asbestos are taken in the proportions of 80 per cent. of the former and 20 per cent. of the latter, and the two substances are thoroughly mixed. On the top of the heat insulating material 21, the heating chamber 22 is mounted. The same consists of two flat sheets of metal 23 and 24 preferably made of copper which are maintained in parallel relation by means of rivets 25 arranged at suitable intervals. I have found that a distance of three inches will keep the copper plates 23 and 24 securely in position. The distance between the copper plates is preferably one-sixteenth of an inch. The heater is inclined at an angle toward the horizontal, preferably of 45 degrees. The lower end of the heating chamber communicates with a horizontal supply pipe 26 with which, at a point intermediate of its ends, the lower circulation pipe 14 is connected. The upper end of the heating chamber terminates in a collecting pipe 27. In order to secure a positive and quick circulation of the heating medium, the collecting pipe 27 slopes upwardly from both ends so that the highest point thereof is approximately in the middle, where the upper circulation pipe 15 conducts the calcium chlorid solution to the heating jacket surrounding the storage tank.

It is obvious that the liquid may freeze in the heater element without bursting the element and causing leaks. In cross section the heating medium will be only approximately one-sixteenth of an inch, that is, from one plate to the other, and the plates may expand readily to allow for the expansion due to freezing this amount of liquid.

Above the heating chamber and in spaced and parallel relation therewith is a pair of glass panes 28 and 29, kept in place by spacing members 30 and 31. These glass panes form a pair of insulating air chambers 32 and 33, respectively, which will prevent the conduction of heat from the heating chamber, upwardly therefrom.

Practically all of the heat of the sun's rays which pass inwardly through the glass panes will be absorbed and retained by the heating medium, as there is almost no loss by reflection, conduction, or radiation.

From the foregoing description, the operation of my improved solar heater will be easily understood. The solar rays passing through the window panes and striking the heating chamber composed of copper plate as explained will quickly heat the heating medium contained therein. Heat conduction upwardly will be prevented by the glass panes forming the two air chambers 32 and 33, while the layer of insulating material on which the heating chamber rests will effectively prevent any heat losses in the downward direction. The heated water will rise to the collecting pipe 27 and to the circulation pipe 15 to the heating jacket 13, while the cooler heating medium will pass from the lower part of the heating jacket through the circulation pipe 14 to the supply pipe 26 in the lower end of the heating chamber. It should be noted that the heated medium will flow to the heating jacket through passages that are all inclined upwardly, while the relatively cooler medium flowing from the bottom of the heating jacket will pass through downwardly inclined passages. The simplicity of construction of the heating chamber will reduce the liability of leakage to a minimum. The employment of a separate heating medium for heating the water in the storage tank will avoid the deposit of any of the salts which ordinary water invariably carries in solution, said deposits in the heating chamber of the ordinary solar heater being the prolific source of leaks. Furthermore, such deposits act as heat insulating material and greatly impair the heating efficiency of the heater. As stated before, it is possible to heat the water in the storage tank to a boiling point by means of the heating medium. The heating chamber is not subjected to strains or stresses due to the expansion or contraction of the heating medium, provisions having been made by the open pipe 16 to allow for the expansion and contraction thereof. Evaporation of the heating medium is prevented by the use of a hygroscopic salt such as calcium chlorid.

While I have described the preferred apparatus as now known to me, it will be understood that I do not desire to confine myself to the specific construction of the parts and the arrangement thereof, as various changes may be made by those skilled in the art without departing from the spirit of my invention as defined in the appended claims.

I claim:

1. In a solar water heater, the combination of a hot water storage tank, a heating jacket about the same, a heating chamber comprising two sheets of metal inclined to the horizontal and mounted in spaced and parallel relation to each other, a horizontal supply pipe communicating throughout the length of the lower end of said heating chamber, a collecting pipe communicating throughout the length of the upper end of said heating chamber, said collecting pipe being inclined upwardly from the ends with the highest point approximately in the middle thereof, a circulation pipe connecting the lower end of said jacket with said supply pipe and a circulation pipe connecting the upper end of said jacket with said collecting pipe at its highest point.

2. A solar heater element, comprising two flat sheets of metal slightly spaced apart and held in parallel, fixed relation to each other by rivets, a supply pipe formed of the same sheets of metal and extending along the lower end, and a collecting pipe formed of the same sheets of metal and extending along the upper end.

3. A solar heater element, comprising two flat sheets of metal slightly spaced apart and held in parallel, fixed relation to each other by rivets, a supply pipe formed of the same sheets of metal and extending along the lower end, and a collecting pipe formed of the same sheets of metal and extending along the upper end, said collecting pipe sloping upwardly from both ends to a point approximately in the center.

4. A solar heater element, comprising a casing, a layer of heat insulating material spread upon the bottom of the casing, a liquid heater and circulator resting upon the insulating material, said heater and circulator comprising two flat sheets of metal slightly spaced apart and held in parallel, fixed relation to each other by rivets, a supply pipe formed of the same sheets of metal and extending along the lower end, and a collecting pipe formed of the same sheets of metal and extending along the upper end, said collecting pipe sloping upwardly from both ends to a point approximately in the center.

In testimony whereof I have signed my name to this specification.

GEORGE WILCOX.